United States Patent
Ryu

(10) Patent No.: US 7,663,079 B2
(45) Date of Patent: Feb. 16, 2010

(54) MICROSCOPE APPARATUS AND FOCAL-DEPTH ENLARGED IMAGE GENERATION METHOD USED THEREFOR

(75) Inventor: Go Ryu, Kawasaki (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/350,415

(22) Filed: Jan. 8, 2009

(65) Prior Publication Data
US 2009/0180179 A1 Jul. 16, 2009

(30) Foreign Application Priority Data
Jan. 10, 2008 (JP) .............................. 2008-002697

(51) Int. Cl.
G02B 21/06 (2006.01)
(52) U.S. Cl. ..................... 250/201.3; 359/383; 359/385; 348/79
(58) Field of Classification Search ............... 250/201.3; 359/383, 385; 348/79
See application file for complete search history.

(56) References Cited

U.S. PATENT DOCUMENTS

| 5,148,502 | A | | 9/1992 | Tsujiuchi et al. | |
| 6,917,377 | B2 | * | 7/2005 | Aizaki et al. | 348/79 |
| 2004/0234114 | A1 | * | 11/2004 | Amakawa et al. | 382/128 |
| 2007/0126866 | A1 | * | 6/2007 | Uchida | 348/79 |
| 2009/0180179 | A1 | * | 7/2009 | Ryu | 359/383 |
| 2009/0219614 | A1 | * | 9/2009 | Ryu et al. | 359/385 |

FOREIGN PATENT DOCUMENTS

JP   3191928 B2   5/2001

\* cited by examiner

*Primary Examiner*—John R Lee
(74) *Attorney, Agent, or Firm*—Frishauf, Holtz, Goodman & Chick, P.C.

(57) ABSTRACT

A microscope apparatus comprises a focusing unit for changing the relative position between a specimen and the focus position of an object lens; and a setup unit for setting a plurality of import regions in the optical axis of the object lens, with a position at which a specimen is focused being established as a reference. It further comprises a control unit for obtaining a plurality of extended time exposure images by changing the relative positions from each respective start position to the end position of each of the plurality of import regions by means of the focusing unit under an import condition determined by desired exposure time and emission light volume; and an image generation unit for generating a focal-depth enlarged image by adding together the obtained plurality of extended time exposure images.

14 Claims, 6 Drawing Sheets

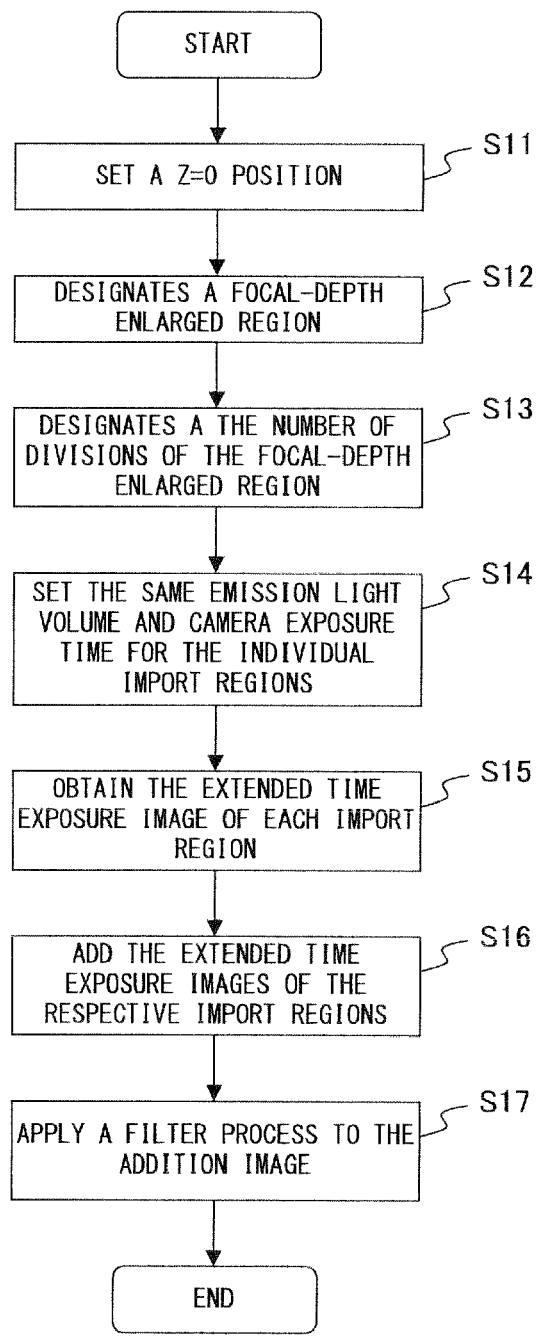
F I G. 2

DESIGNATION OF IMPORT REGIONS

FOCAL-DEPTH ENLARGED REGION (±nm)

2000

NUMBER OF DIVISIONS OF THE FOCAL-DEPTH ENLARGED REGION

8

START POSITION AND END POSITION OF EACH IMPORT REGION

| IMPORT REGION NUMBER | START POSITION | END POSITION |
|---|---|---|
| 1 | -2000 | -1500 |
| 2 | -1500 | -1000 |
| 3 | -1000 | -500 |
| 4 | -500 | 0 |
| 5 | 0 | 500 |
| 6 | 500 | 1000 |
| 7 | 1000 | 1500 |
| 8 | 1500 | 2000 |

DESIGNATION OF IMPORT CONDITION

CAMERA EXPOSURE TIME FOR EACH IMPORT REGION

| INPORT REGION NUMBER | EXPOSURE TIME (msec) |
|---|---|
| 1 | 5 |
| 2 | 5 |
| 3 | 5 |
| 4 | 5 |
| 5 | 5 |
| 6 | 5 |
| 7 | 5 |
| 8 | 5 |

LIGHT SOURCE EMISSION LIGHT VOLUME FOR EACH IMPORT REGION

| INPORT REGION NUMBER | EMISSION LIGHT VOLUME (%) |
|---|---|
| 1 | 30 |
| 2 | 30 |
| 3 | 30 |
| 4 | 30 |
| 5 | 30 |
| 6 | 30 |
| 7 | 30 |
| 8 | 30 |

SELECT AN IMPORT REGION

1

DESIGNATION-USE DISPLAY IMAGE

F I G. 3

DESIGNATION OF IMPORT REGIONS

FOCAL-DEPTH ENLARGED REGION (±nm)
2000

NUMBER OF DIVISIONS OF THE FOCAL-DEPTH ENLARGED REGION
8

START POSITION AND END POSITION OF EACH IMPORT REGION

| IMPORT REGION NUMBER | START POSITION | END POSITION |
|---|---|---|
| 1 | −2000 | −1500 |
| 2 | −1500 | −1000 |
| 3 | −1000 | −500 |
| 4 | −500 | 0 |
| 5 | 0 | 500 |
| 6 | 500 | 1000 |

DESIGNATION OF IMPORT CONDITION

CAMERA EXPOSURE TIME FOR EACH IMPORT REGION

| IMPORT REGION NUMBER | EXPOSURE TIME (msec) |
|---|---|
| 1 | 5 |
| 2 | 5 |
| 3 | 5 |
| 4 | 5 |
| 5 | 6 |
| 6 | 4 |

LIGHT SOURCE EMISSION LIGHT VOLUME FOR EACH IMPORT REGION

| IMPORT REGION NUMBER | EMISSION LIGHT VOLUME (%) |
|---|---|
| 1 | 30 |
| 2 | 40 |
| 3 | 50 |
| 4 | 30 |
| 5 | 25 |
| 6 | 35 |

SELECT AN IMPORT REGION
1

DESIGNATION-USE DISPLAY IMAGE

FIG. 5

MICROSCOPE APPARATUS AND FOCAL-DEPTH ENLARGED IMAGE GENERATION METHOD USED THEREFOR

CROSS REFERENCE TO RELATED APPLICATIONS

This application is based upon and claims the benefit of priority from the prior Japanese Patent Application No. 2008-002697, filed Jan. 10, 2008, the entire contents of which are incorporated herein by reference.

BACKGROUND OF THE INVENTION

1. Field of the Invention

The present invention relates to a microscope apparatus used for an observation or examination of a specimen and to a focal-depth enlarged image generation method used therefor.

2. Description of the Related Art

Microscopes are widely used for defect inspection and structural observation of a device pattern in the processes for producing a semiconductor, et cetera. Associated with rapid progress in further miniaturization and complexity of device patterns in recent years, there have been increased demands on the optical microscopes for further improvement in resolution. In order to meet such demands, the use of an object lens with a large numerical aperture NA and the use of light with shorter wavelengths, such as infrared, for an illumination light have been tried.

Enlarging the NA of an object lens or shortening the wavelength of an illumination light causes a focal depth to become shallower. In such a case, if there is a step that is larger than the depth of focus in the specimen, a blurred image will result. Therefore, it is desired that the microscopes obtain a high resolution, large focal depth image.

Meanwhile, the materials used for producing a semiconductor, such as aluminum (Al) and copper (Cu), possess different reflectivities and absorptivities against infrared with different wavelength bands so that a defect analysis and a structural analysis that take advantage of these characteristics can be performed on an infrared microscope. In a specific example, a semiconductor device is observed by changing the wavelength band of an infrared light used as the illumination and a change in the reflectivities of a device material is detected by a change in the pixel value of an observation image, and thereby the device material can be identified. Such a microscope using infrared lights with a plurality of wavelength bands is called a plural wavelengths infrared microscope.

The depth of focus is different depending on the wavelength in the plural wavelengths infrared microscope and therefore there is a possibility that an observation image picked up with a long wavelength band will be in focus, while a part of the observation image picked up with a short wavelength may be out of focus. Therefore, a depth of focus needs to be increased for a shorter wavelength band.

There have conventionally been various concepts as methods for increasing a depth of focus. For example, reference patent document 1 has disclosed a technique that adds together plural pieces of images (the resultant image is noted as "addition image" hereinafter) with different positions respectively in focus in the optical axis direction and applies a restoration process to the addition image using a restoration filter, thereby restoring one piece of a focused image.

A conceivable method for obtaining an addition image is to change the focus positions continuously and to also accumulate the images imaged on the photo acceptance unit of an imaging element. In this method, the input and addition of images with their focuses being changed continuously are performed in the imaging element by utilizing an accumulation effect of a photo energy of the imaging element.

In the meantime, the above described method of continuously changing the focus position and obtaining an addition image utilizing the accumulation effect of the imaging element is faced with a limitation in the dynamic range of a camera in which an imaging element is incorporated and therefore an addition image with saturated brightness tends to be produced. In order to prevent the occurrence of such saturated brightness, it is conceivable to reduce the exposure time of the camera or the irradiation light volume of a light source; either case, however, is faced with the problem of a degraded S/N ratio in the addition image.

In the method of obtaining an addition image according to patent document 1, there is a possibility that saturated brightness will occur in the high reflectance part of the addition image if the exposure time of a camera and the emission light volume of a light source are set in line with the low reflectance part of a specimen.

Patent document 1: Registered Japanese Patent No. 3191928

SUMMARY OF THE INVENTION

A microscope apparatus according to the present invention comprises a light source unit; an imaging unit for imaging a specimen irradiated with the light from the light source unit; a focusing unit for changing a relative position between a specimen and a focus position of an object lens; a setup unit for setting a plurality of import regions in a optical axis direction of the object lens, with a position at which the specimen is focused being established as a reference; a control unit for obtaining a plurality of extended time exposure images by changing, under an import condition determined by a exposure time and an emission light volume, the relative position from each respective start position of each of the plurality of import regions to an end position by the focusing unit; and an image generation unit for generating a focal-depth enlarged image by adding together the obtained plurality of extended time exposure images.

The above described microscope apparatus is preferably configured such that the setup unit comprises means for designating a focal-depth enlarged region in a predetermined range, with a position at which the specimen is focused being established as the reference, and designating a number of divisions for dividing the focal-depth enlarged region into the plurality of import regions.

The above described microscope apparatus is also preferably configured such that the setup unit comprises unit for designating a focal-depth enlarged region in a predetermined range, with a position at which the specimen is focused being established as the reference; unit for designating the start position and end position of each import region when the focal-depth enlarged region is divided into a plurality of import regions; and unit for designating the exposure time and the emission light volume of the light source unit, both for each import region.

The above described microscope apparatus is also preferably configured such that, when either the exposure time or emission light volume is designated for each import region, the control unit obtains the extended time exposure image under an import condition determined by the designated exposure time and desired emission light volume or by the designated emission light volume and the desired exposure time at the middle position of each import region, and adjusts the desired emission light volume or the desired exposure time at which the brightness of the obtained extended time exposure image is not saturated.

BRIEF DESCRIPTION OF THE DRAWINGS

FIG. 2 is a flow chart showing the operation of a microscope apparatus according to the first embodiment;

FIG. 3 is a diagram showing an exemplary setup screen;

FIG. 5 is a diagram showing an exemplary setup screen according to a second preferred embodiment.

DESCRIPTION OF THE PREFERRED EMBODIMENTS

Figure 1:
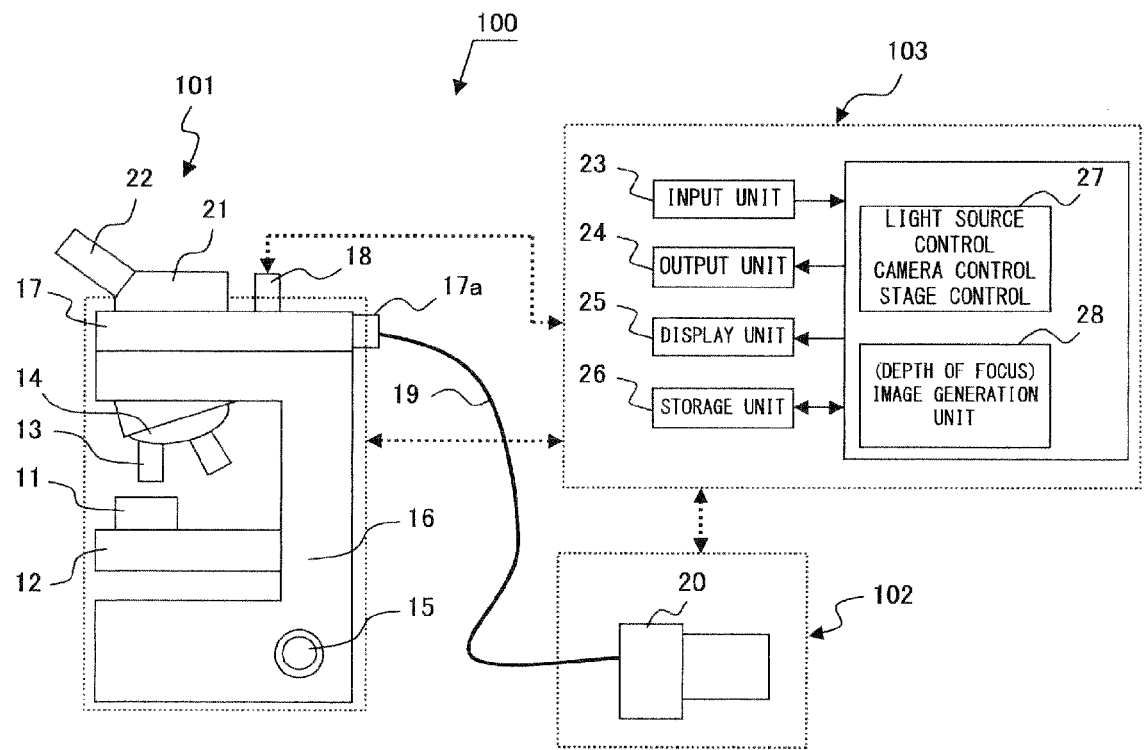
FIG. 1 is a diagram showing the configuration of a microscope apparatus according to a first preferred embodiment.

The following is a description of the preferred embodiment of the present invention. FIG. 1 is a diagram showing the configuration of a microscope apparatus 100 according to a first preferred embodiment.

The microscope apparatus 100 comprises a microscope body 101, a light source apparatus 102, and a control apparatus 103. The microscope body 101 comprises a stage 12 on which a specimen 11 is placed; an object lenses 13; a revolver 14 for mounting object lenses 13; a focusing mechanism 15 for moving the stage 12; a frame 16; a floodlight tube 17; a lens tube 21; and an eyepiece 22.

The object lens 13 is freely detachably mounted onto the revolver 14 and is placed above the stage 12 in accordance with the revolving operation of the revolver 14.

The stage 12, being driven by a planar driving mechanism (which is not shown in a drawing), can be freely moved in the horizontal plane that is perpendicular to the optical axis of the object lens 13 and changes the observation position of the specimen 11 relative to the object lens 13. Further, the stage 12 is moved up and down in the vertical direction (i.e., the optical axis direction of the object lens 13) by means of the focusing mechanism 15 so as to change the relative position (relative distance) between the specimen 11 and the focus position of the object lens 13 and to focus the object lens 13 relative to the specimen 11. The focusing mechanism 15 is connected to the control apparatus 103 and the operation of the focusing mechanism 15 is controlled by the control apparatus 103. Note that the focusing mechanism 15 may alternatively be configured to move up and down the object lens 13 in the vertical direction in place of the stage 12 moving it.

The floodlight tube 17 internally comprises an illumination optical system and an observation optical system (neither of which is shown in a drawing). A camera (corresponding to an imaging unit) 18 is mounted onto the top part of the floodlight tube 17. Further, the fiber connecter 17a of the floodlight tube 17 is equipped with an optical fiber 19 which is connected to the light volume adjustment unit 20 of the light source apparatus 102.

The illumination optical system comprised within the floodlight tube 17 irradiates the specimen 11 as the illumination light, by way of the object lens 13, with the light guided from the light volume adjustment unit 20 by way of the optical fiber 19. The floodlight tube 17, in collaboration with the object lens 13 and using the observation optical system, further images an observation image of the specimen 11 illuminated by the illumination optical system. The camera 18 captures the observation image, generates observation image data, and outputs the generated observation image data to the control apparatus 103.

The lens tube 21, comprising an imaging lens (not shown in a drawing) images the visible observation image of the specimen 11 in collaboration with the object lens 13. The visible observation image can be visually observed through the eyepiece 22.

The light source apparatus 102 comprises a light source (not shown in a drawing) and a light volume adjustment unit 20. The floodlight tube 17, optical fiber 19, and light source apparatus 102 are integrally called a light source unit hereinafter.

The control apparatus (corresponding to a setup unit, a control unit, and an image generation unit) 103 comprises an input unit 23 used for inputting image data and the data and the like set by a user; an output unit 24 for outputting control data; a display unit 25 for displaying a graphical user interface (GUI) screen and the like; a storage unit 26; a control unit 27; and an image generation unit 28 for generating a focal-depth enlarged image.

The input unit 23, comprising a keyboard, a mouse and a communication apparatus, is used for inputting various setup data and the like by way of a GUI screen displayed on the display unit 25.

The output unit 24, comprising a communication apparatus, a portable recording medium, and the like, outputs various observation data, including observation image data and process data, to the outside. The display unit 25, constituted by a liquid crystal display (LCD) or the like, displays an observation image, setup information, and notice information.

The storage unit 26, comprising a hard disk, read only memory (ROM), random access memory (RAM), and the like, stores a control program for controlling the microscope apparatus 100 and also stores various kinds of data including the observation image data.

The control unit 27, disposed to control the operation of the individual units of the microscope apparatus 100, controls the light source apparatus 102, camera 18, stage 12, et cetera. The control unit 27, comprising a microprocessor unit (MPU), causes the MPU to read the control program stored in the storage unit 26, and execute the program, thereby executing the above described control. Further, the control unit 27 moves the stage 12 continuously from the start position to the end position of a plurality of import regions using a position that is in focus as a reference and obtains the extended time exposure image of each import region by capturing the image. In other words, the control unit 12 moves the stage 12 continuously, changes the relative position (relative distance) between the specimen and the focus position of the object lens.

The image generation unit 28 adds the extended time exposure images of the respective import regions to generate a focal-depth enlarged image.

Note that the control apparatus 103 may be constituted by a specific purpose apparatus, a generic use personal computer (PC), or the like. The PC comprises, for example, an arithmetic processing unit, such as an MPU, for controlling an overall control in accordance with a control program; main memory used by the arithmetic processing unit for work memory; a storage apparatus, such as a hard disk, for storing each program, data of a processing result, et cetera; an interface unit for exchanging data; an input apparatus for obtaining an instruction from the user; and a display apparatus for displaying information.

Next is a description of such a configured microscope apparatus 100 with reference to the flow chart shown in FIG. 2, which shows together the operations carried out by a person (i.e., a user) and the process executed by the control apparatus 103.

The user places a specimen 11 on the stage 12, moves the stage 12 up and down in the optical direction of the object lens 13 while visually performing observation through the eyepiece 22 by irradiating the specimen 11 with a visible light, and focuses on the specimen 11. She/he then sets a position at which the specimen is in focus as a reference position (Z=0) (refer to S11 of FIG. 2; the same hereinafter). The operation of the focusing may be automatically performed by the control unit 27.

Then, in the setup screen, the user designates a range ±x from the reference position Z=0 as a focal-depth enlarged region (S12) and further designates the number of divisions of the focal-depth enlarged region (S13). When the range and number of divisions of the focal-depth enlarged region are designated, for example, the control unit 27 divides the focal-depth enlarged region into the specified number of divisions, calculates the respective start position and end position of the individual import regions, and stores them in the storage unit 26.

Then, the same emission light volume and camera exposure time are set for the individual import regions determined by the designated number of divisions (S14). If a desired exposure time is set, for example, for the reference position Z=0, a continuous photographing is carried out with the designated exposure time and the emission light volume is set at a maximum within a range such that the picked up image is not saturated in step S14.

Then, the extended time exposure image of each import region is obtained (S15). The stage 12 is continuously moved, for example, from the start position to the end position of each import region and a plurality of extended time exposure images is photographed while the camera 18 is maintained in the exposure state during the movement of the stage 12 in step S15.

Then, the extended time exposure images of the respective import regions are added to generate one addition image (S16). A focal-depth enlarged image is generated by applying a filtering process to the addition image (S17).

FIG. 3 is a diagram showing an exemplary setup screen for the setting of the import region of a focal-depth enlarged region and the import condition in the microscope apparatus 100 according to the first embodiment. The setup screen is displayed in the display unit 25 under the control of the control unit 27.

The user of the microscope apparatus 100 designates the distance of a focal-depth enlarged region from the reference position (at Z=0) in the positive and negative directions in the Z axis direction and from the number of divisions of the focal-depth enlarged region.

FIG. 3 exemplifies the case of designating "±2000 nm" as the distance of a focal-depth enlarged region and "8" as the number of divisions of the focal-depth enlarged region.

When the distance of the focal-depth enlarged region in the Z axis direction and the number of divisions "8" are designated, the control unit 27 divides the range +2000 nm to −2000 nm into eight import regions and calculates the start position and end position of each import region. FIG. 3 exemplifies the case of the control unit 27 setting "−2000" as the start position of the first import region and "−1500" as the end position thereof, "−1500" as the start position of the second import region and "−1000" as the end position thereof, through to setting "−500" as the start position of the fourth import region and "0" as the end position thereof, and storing these set values in the storage unit 26.

Then, the user designates the exposure time for each import region and the emission light volume of the light source in the setup screen of the import condition. For example, if the exposure time for the first import region that is the import region number "1" is designated, then the middle position is calculated from the start position and end position, then a continuous photographing is carried out with the exposure time by changing the emission light volume of the light source at the middle position, and the maximum emission light volume under which the image is not saturated is calculated. Then, the maximum emission light volume and exposure time are set as the emission light volume and exposure time (i.e., the import condition) for each import region.

FIG. 3 exemplifies the case of automatically setting the exposure time to "5 msec" and the emission light volume to "30%", which are the same import conditions for each import region when the maximum emission light volume is "30%" of the maximum value with the exposure time designated at "5 msec" in a specific position or specific import region.

Note that the above description exemplifies the case of determining the emission light volume of the light source after designating the exposure time; alternatively, it is possible to determine the emission light volume of the light source first, and then set the exposure time by calculating the maximum exposure time under which an image is not saturated when a continuous photographing is carried out.

Note that, if the import condition for each import region is designated at the same condition, the control data for controlling the emission light volume of the light source and the exposure time of the camera 18 are the same and therefore the time for exchanging the control data can be shortened.

Figure 4:
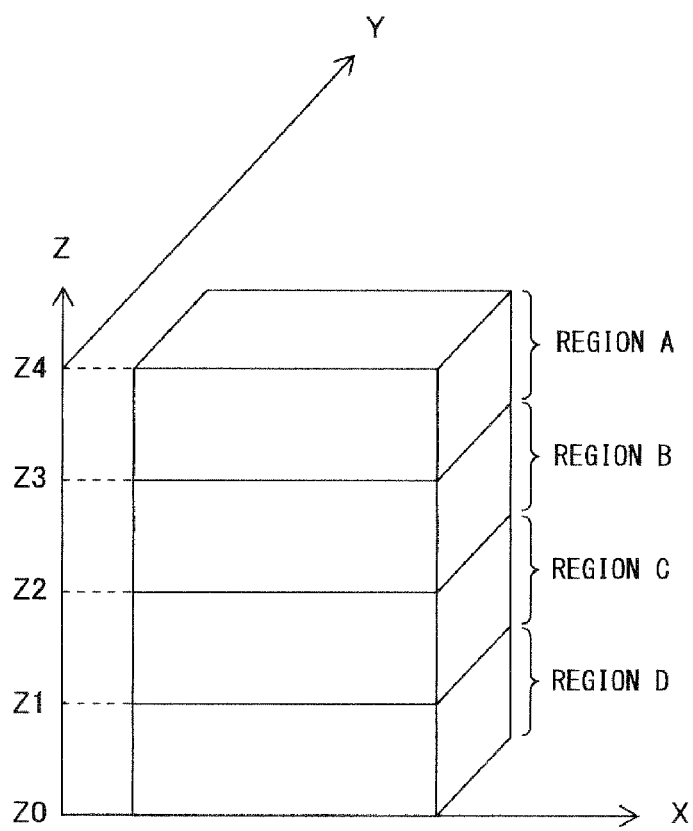
FIG. 4 is a diagram describing the import region of a focal-depth enlarged area.

FIG. 4 is a diagram describing the import region of a focal-depth enlarged area. If "8" is designated as the number of divisions, the import region is divided into four import regions in the positive direction of the Z axis, with the focused position Z0 at the center as shown in FIG. 4, and it is also divided into four import regions in the negative direction of the Z axis (which is not shown in a drawing here).

When the exposure time and emission light volume are designated, the control unit 27 calculates a moving speed so that the moving time of the stage 12 is equal to the exposure time on the basis of the distance between the start position Z4 and end position Z3 on the region A in the Z axis direction. Then it moves the stage 12 from the start position Z4 to the end position Z3 at the calculated moving speed and in the meantime keeps the camera 18 in such an exposure state as to obtain the extended time exposure image. The obtained extended time exposure image of the import region A is stored in the storage unit 26.

Then the control unit 27 moves the stage 12 continuously from the start position Z3 to the end position Z2 and in the meantime keeps the camera 18 in such an exposure state as to obtain the extended time exposure image of the import region B. Likewise, it moves the stage 12 continuously from the start position Z2 to the end position Z1 and in the meantime keeps the camera 18 in such an exposure state as to obtain the extended time exposure image of the import region C. The control unit 27 further moves the stage 12 continuously from the start position Z1 to Z0 and in the meantime keeps the camera 18 in such an exposure state as to obtain the extended time exposure image of the import region D. The control unit 27 carries out a similar photographing for the import regions in the negative direction of the Z axis. Lastly, the control unit 27 generates one addition image by adding together the extended time exposure images of the eight import regions and generates a focal-depth enlarged image by applying a filtering process to the addition image.

As described above, the first embodiment is configured to divide a focal-depth enlarged region into a plurality of import regions, obtain the extended time exposure image of each import region, and generate one focal-depth enlarged image by adding together a plurality of the extended time exposure images. This configuration makes it possible to make the exposure time for each import region longer, or the emission light volume larger, than in the case of generating one focal-depth enlarged image using the entirety of a focal-depth enlarged region, and therefore it is possible to generate a high image quality focal-depth enlarged image with a good S/N ratio without saturating the brightness.

Next is a description of a second preferred embodiment of the present invention. The second embodiment is configured to designate the optimal exposure time and emission light volume of a light source in the middle position of each import region.

FIG. 5 is a diagram showing an exemplary GUI screen for designating import regions and import conditions according to the second embodiment.

FIG. 5 exemplifies the case of designating "±2000 nm" as the size of a focal-depth enlarged region and "8" as the number of divisions. When the size of a focal-depth enlarged region and the number of divisions are designated, the control unit 27 calculates the start position and end position of each import region, calculates "−2000" as the start position of the first import region, "−1500" as the end position thereof, "−1500" as the start position of the second import region, "−1000" as the end position thereof, and so on, and displays the calculated numbers as the start position and end position of the setup screen shown in FIG. 5.

Then, in order to designated the import conditions, the user selects a specific import region (for example, the first import region) and designates either the parameter of exposure time or the parameter of emission light volume, prompting the control unit 27 to move the stage 12 to the middle position of the first import region, adjusts the parameter not yet designated (the desired exposure time or the desired emission light volume) to maximum value at which the brightness of the obtained extended time exposure image is not saturated. The extended time exposure image is displayed in the "designation-use display image" portion shown in FIG. 5. Note that an alternative configuration may be such that the user visually confirms a photographed extended time exposure image and adjusts the emission light volume of a light source or the exposure time in a range in which saturation in brightness does not occur.

When the import condition for the first import region is completely designated, the user designates the respective import conditions for the second import region, the third import region, and so forth.

The above description exemplifies the case of first designating the exposure time; alternatively, it is also possible to designate the emission light volume of the light source and then determine the exposure time on the basis of the emission light volume. Meanwhile, the position of importing an extended time exposure image may not necessarily be the center position of an import region and instead may be a discretionary position, or the extended time exposure image may be obtained by continuously applying the exposure while moving the stage 12 from the start position of each import region to the end position thereof.

The above described second embodiment makes it possible to set the optimal exposure time and emission light volume for each import region of a focal-depth enlarged region, thereby enabling the generation of a focal-depth enlarged image with good image quality even if the reflectance of a specimen differs in respective focal positions.

Next is a description of a third preferred embodiment of the present invention. The third embodiment is configured to correct the extended time exposure image of each import region with a weighting factor when the exposure time for each import region and the emission light volume of a light source are discretionarily designated.

Here, where "PStart [i] is defined as the start position of the designated i-th import region, "PEnd[i]" as the end position, "L[i]" as the emission light volume of the light source for the i-th import region, and "E[i]" as the exposure time in the above described setup screen, a value "k" is calculated as follows:

$$k[i] = |PEnd[i] - PStart[i]| / (L[i] * E[i])$$

Then, with the value k of the j-th import region used as a reference, the values k of other import regions is normalized to calculate a weighting factor. Where "1" is the weighting factor sk[j] of the j-th import region, the weighting factor sk[i] of the i-th import region is expressed by the following expression using the value k:

$$sk[i] = k[i] / k[j]$$

The above described weighting factor is multiplied to the extended time exposure image of each import region, and the image data of the post-multiplication extended time exposure images are added to obtain one addition image. A focal-depth enlarged image is obtained by applying a filtering process to the addition image.

As described above, the third embodiment makes it possible to obtain a correct extended time exposure image with the difference in the import conditions corrected by multiplying respective weighting factors to the extended time exposure images of the individual import regions even if the exposure time of each import region and emission light volume of the light source is different when a focal-depth enlarged region is divided into a plurality of import regions.

Next is a description of a fourth preferred embodiment of the present invention. The fourth embodiment is configured to obtain one extended time exposure image by moving the stage 12 from the start position of the entire focal-depth enlarged region to the end position thereof and calculate the maximum emission light volume of a light source or the maximum exposure time within a range in which the brightness of the aforementioned extended time exposure image is not saturated.

According to the fourth embodiment, the user designates, for example, a desired exposure time (i.e., the maximum exposure time Efull) in the setup screen shown in FIG. 5. The control unit 27 controls the movement of the stage 12 so as to complete the movement from the start position to the end position of the focal-depth enlarged region within the designated exposure time and obtains one piece of extended time exposure image. Then it adjusts the emission light volume so as to not let a saturation in brightness occur in the extended time exposure image. The control unit 27 repeats obtaining such an extended time exposure image and adjusting the emission light volume and determines the maximum emission light volume EFull at which the saturation in brightness does not occur.

Then, the control unit sets the emission light volume of the light source for each import region. For example, where "E[i]" is the exposure time of the camera 18 for the i-th import region, the optimal emission light volume L[i] for the import region can be obtained from the following expression:

$$L[i] = LFull * EFull / E[i]$$

Although the above expression calculates the optimal emission light volume when an exposure time E [i] is designated, the optimal exposure time can also be calculated from the above expression when the emission light volume for each import region is designated.

Note that the maximum emission light volume EFull can be determined on the basis of the process time required until, for example, a focal-depth enlarged image that is desired by the user is reached the process time which is desired by the user to obtain the focal-depth enlarged image". Once the process time is determined, the time is set as the maximum exposure time so that the maximum emission light volume EFull at which an image is not saturated can be determined when the extended time exposure image of the entire focal-depth enlarged region is photographed.

The above described fourth embodiment is configured to designate a desired maximum emission light volume EFull, photograph the extended time exposure image of the entire focal-depth enlarged region, and determine the maximum emission light volume EFull of the light source on the basis of the photographing result. Further, the exposure time (or the emission light volume) for each import region is designated, and the control unit 27 can automatically set the optimal exposure time (or emission light volume) for each import region from the maximum emission light volume EFull and the maximum emission light volume LFull. This configuration makes it possible to designate the import condition for each import region in a short time and obtain a high image quality focal-depth enlarged image.

Figure 6:
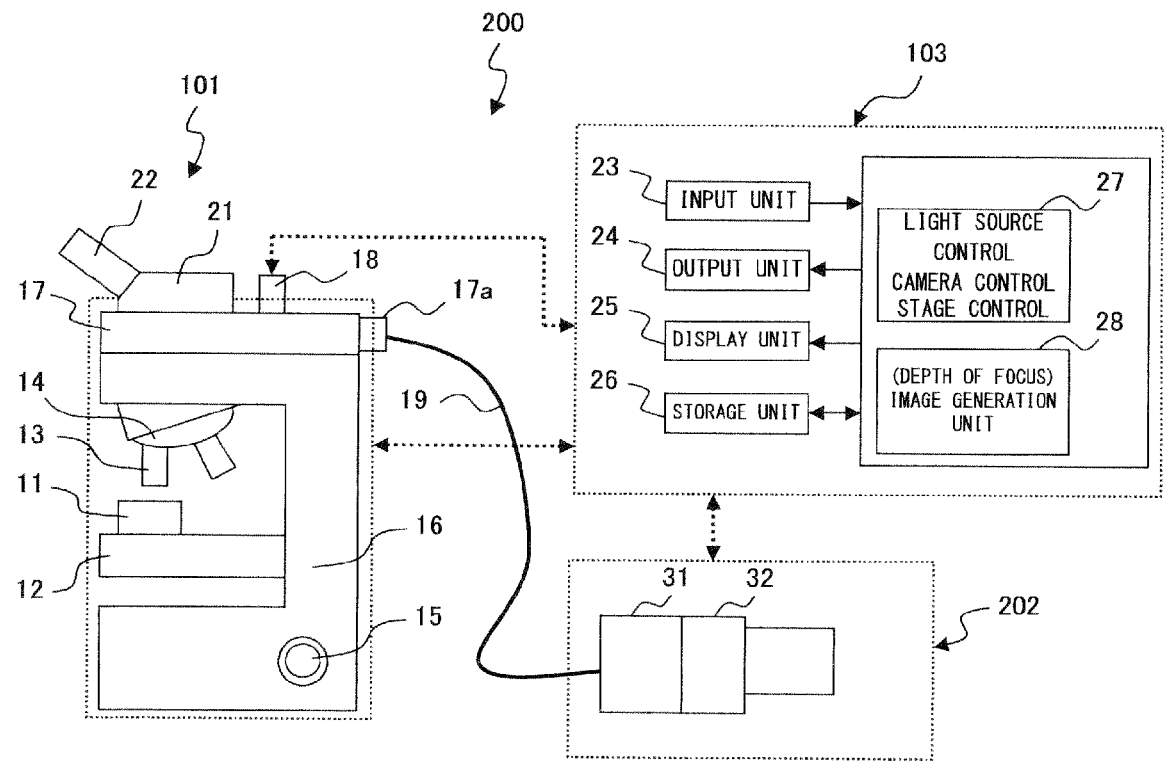
FIG. 6 is a diagram showing the configuration of a microscope apparatus according to a fifth preferred embodiment.

Next, FIG. 6 is a diagram showing the configuration of a microscope apparatus 200 according to a fifth preferred embodiment of the present invention. The fifth embodiment is configured to generate a plurality of focal-depth enlarged images by illuminating lights with different wavelengths and substitute the red (R) component, green (G) component and blue (B) component of one color image with a plurality of focal-depth enlarged images. In the following description, the same component sign is assigned to the same component used in the microscope apparatus 100 shown in FIG. 1, and the description is not provided here.

Referring to FIG. 6, the light source apparatus 202 comprises a light volume adjustment unit 32 and a wavelength selection unit 31. The light volume adjustment unit 32 adjusts the light volume of the ultraviolet light emitted from a light source (not shown in the drawing) in accordance with the control of the control unit 27. The wavelength selection unit 31 selects the ultraviolet light of the wavelength that is set by the control unit 27 and outputs the light to the optical fiber 19.

When the user designates the scope of a focal-depth enlarged region, the number of divisions, and the import condition for each region, the extended time exposure image of each import region is obtained. In this event, the control unit 27 obtains three extended time exposure images by irradiating individual import zones with ultraviolet lights with different wavelengths. Then the control unit 27 generates focal-depth enlarged images of three wavelengths by adding together the extended time exposure images of respective import regions and applying a filtering process. The control unit 27 further sets the image data of the focal-depth enlarged images of three wavelengths as the R, G and B components of one color image that has been provided in advance of the process.

With this, three focal-depth enlarged images of different wavelengths are displayed as the R, G and B components of one color image. The human eye can easily recognize the difference between the R, G and B components and therefore it is possible for the naked eye to intuitively recognize a defect or the like in the specimen 11 by simultaneously looking at the three kinds of focal-depth enlarged images with different wavelengths.

Incidentally, when trying to focus the specimen 11, there is a possibility that it will be focused in a long wavelength band while it cannot be focused in a short wavelength band because the depth of focus differs with the wavelength. Accordingly, the fifth embodiment is configured to designate the same focal-depth enlarged region for each wavelength and generate a focal-depth enlarged image in all wavelength bands.

The above described fifth embodiment is configured to generate a plurality of focal-depth enlarged images by irradiating the specimen with lights with different wavelengths and to display the plurality of focal-depth enlarged images as the R, G and B components of one color image, thereby making it possible to simultaneously confirm the focal-depth enlarged images with different wavelengths. This configuration makes it possible to visually perform, for example, defect inspection of a semiconductor device and structural analysis thereof.

The present embodiments make it possible to obtain a focal-depth enlarged image with good image quality.

The present invention is not limited to the above described embodiments; and it may be embodied as follows.

That is, the above described present embodiments are configured to make the size of each import region the same on the basis of the number of divisions; an alternative configuration may be such that the user is enabled to discretionarily designate the start position and end position of each import region.

What is claimed is:

1. A microscope apparatus, comprising:
   a light source unit;
   an imaging unit for imaging a specimen irradiated with a light from the light source unit;
   a focusing unit for changing a relative position between a specimen and a focus position of an object lens;
   a setup unit for setting a plurality of import regions in an optical axis direction of the object lens, with a position at which the specimen is focused being established as a reference;
   a control unit for obtaining a plurality of extended time exposure images by changing, under an import condition determined by a exposure time and an emission light volume, the relative positions from each respective start position to end position of each of the plurality of import regions by the focusing unit; and
   an image generation unit for generating a focal-depth enlarged image by adding together the obtained plurality of extended time exposure images.

2. The microscope apparatus according to claim 1, wherein the setup unit comprises unit for designating a focal-depth enlarged region in a predetermined range, with a position at which the specimen is focused being established as the reference, and designating a number of divisions for dividing the focal-depth enlarged region into the plurality of import regions.

3. The microscope apparatus according to claim 1, wherein the setup unit comprises unit for designating the focal-depth enlarged region in a predetermined range, with a position at which the specimen is focused being established as the reference, unit for designating the start position and the end position of each import region when the focal-depth enlarged region is divided into the plurality of import regions, and unit for designating the exposure time and the emission light volume of the light source unit, both for each import region.

4. The microscope apparatus according to claim 1, wherein,
   when either the exposure time or emission light volume is designated for each import region, the control unit obtains the extended time exposure image under an import condition determined by the designated exposure time and desired emission light volume or by the designated emission light volume and the desired exposure time at the middle position of each import region, and adjusts the desired emission light volume or the desired exposure time for each import region to a maximum value at which the brightness of the obtained extended time exposure image is not saturated.

5. The microscope apparatus according to claim 1, wherein,
   when either the exposure time or emission light volume is designated for the plurality of import regions, the control unit obtains the extended time exposure image by changing the relative position from the start position to the end position of an entire focal-depth enlarged region under an import condition determined by the designated exposure time and desired emission light volume or by the designated emission light volume and the desired exposure time, and adjusts the desired exposure time or the desired emission light volume for the plurality of import regions to a maximum value at which the brightness of the obtained extended time exposure image is not saturated.

6. The microscope apparatus according to claim 1, wherein when either the exposure time is designated for the plurality of import regions, the control unit obtains the extended time exposure image by changing the relative position from the start position to the end position of the import region under an import condition determined by the designated exposure time and by a desired emission light volume, and adjusts the desired emission light volume for the import region to a maximum value at which the brightness of the obtained extended time exposure image is not saturated.

7. The microscope apparatus according to claim 1, wherein when the emission light volume is designated for the import region, the control unit obtains the extended time exposure image by changing the relative positions from the start position to the end position of the import region under an import condition determined by the designated emission light volume and by a desired exposure time, and adjusts the desired exposure time for the import region to a maximum value at which the brightness of the obtained extended time exposure image is not saturated.

8. The microscope apparatus according to claim 1, wherein the control unit calculates, as the weighting factor for each import region, a value obtained by normalizing a value k of another import region on the basis of a ratio k which is the ratio used as a reference, where the ratio k is the difference between the start position and end position of the i-th import region to the value obtained by multiplying the exposure time and the emission light volume, and normalizes the extended time exposure image of each import region by multiplying the weighting factor for each import region and the extended time exposure image of each import region when the extended time exposure images of the plurality of import regions are obtained.

9. The microscope apparatus according to claim 1, wherein the light source unit irradiates a specimen with a plurality of lights with different wavelengths, and the image generation unit generates a plurality of focal-depth enlarged images by adding together the plurality of extended time exposure images obtained by irradiating the specimen with the plurality of lights with the different wavelengths, and generates one color image having the plurality of extended time exposure images as red (R), green (G) and blue (B) components.

10. A focal-depth enlarged image generation method used for a microscope apparatus, comprising:
designating a plurality of import regions in an optical axis direction of an object lens, with a position at which a specimen is focused used as a reference;
obtaining a plurality of extended time exposure images by having a focusing unit that changes the relative position between the specimen and the focus position of the object lens from start position to end position of each of the plurality of import regions under an import condition determined by a exposure time and an emission light volume; and
generating a focal-depth enlarged image by adding together the obtained plurality of extended time exposure images.

11. The focal-depth enlarged image generation method used for a microscope apparatus according to claim 10, further comprising:
designating a focal-depth enlarged region in a predetermined range, with a position at which the specimen is focused being established as the reference, and designating a number of divisions for dividing the focal-depth enlarged region into a plurality of import regions.

12. The focal-depth enlarged image generation method used for a microscope apparatus according to claim 10, further comprising:
when either the exposure time or the emission light volume of a light source unit is designated for the plurality of import regions, obtaining the extended time exposure image by having the focusing unit that changes the relative position from the start position to the end position of each of the plurality of import regions under an import condition determined by the designated exposure time and desired emission light volume or by the designated emission light volume and the desired exposure time; and
adjusting the desired exposure time or the desired emission light volume for the plurality of import regions to a maximum value at which the brightness of the obtained extended time exposure image is not saturated.

13. The focal-depth enlarged image generation method used for a microscope apparatus according to claim 10, further comprising:
when either the exposure time or emission light volume is designated for each import region, obtaining the extended time exposure image under an import condition determined by the designated exposure time and desired emission light volume or by the designated emission light volume and the desired exposure time at the middle position of each import region; and
adjusting the desired emission light volume or the desired exposure time to a maximum value at which the brightness of the obtained extended time exposure image is not saturated.

14. The focal-depth enlarged image generation method used for a microscope apparatus according to claim 10, further comprising:
when either the exposure time or the emission light volume of a light source unit is designated for the plurality of import regions, obtaining one extended time exposure image by having the focusing unit that changes the relative position from the start position to the end position of a entire focal-depth enlarged region under an import condition determined by the designated exposure time and desired emission light volume or by the designated emission light volume and the desired exposure time and;
adjusting the desired emission light volume or the desired exposure time to a maximum value at which the brightness of the obtained extended time exposure image is not saturated.

* * * * *